United States Patent [19]

Hettich

[11] Patent Number: 5,401,124
[45] Date of Patent: Mar. 28, 1995

[54] HAND-HELD POWER TOOL WITH JAMMING-DETECTION SENSOR

[75] Inventor: Volker Hettich, Leinfelden-Echterdingen, Germany

[73] Assignee: Robert Bosch GmbH, Stuttgart, Germany

[21] Appl. No.: 133,026

[22] PCT Filed: Apr. 7, 1992

[86] PCT No.: PCT/DE92/00273
§ 371 Date: Oct. 8, 1993
§ 102(e) Date: Oct. 8, 1993

[87] PCT Pub. No.: WO92/18291
PCT Pub. Date: Oct. 29, 1992

[30] Foreign Application Priority Data

Apr. 12, 1991 [DE] Germany .................. 41 12 012.4

[51] Int. Cl.⁶ .............................................. B23B 47/24
[52] U.S. Cl. .................... 408/6; 73/862.29; 173/176; 408/9
[58] Field of Search ............... 408/5, 6, 8, 9, 11; 173/176, 178, 181, 182; 73/862.29, 862.31

[56] References Cited

U.S. PATENT DOCUMENTS

| | | | |
|---|---|---|---|
| 4,063,600 | 12/1977 | Krzes | 173/176 |
| 4,448,261 | 5/1984 | Kousek et al. | 408/6 |
| 4,487,270 | 12/1984 | Huber | 173/176 |
| 4,534,420 | 8/1985 | Golelius | 173/176 |
| 4,638,870 | 1/1987 | Kousek | 408/6 |

FOREIGN PATENT DOCUMENTS

| | | |
|---|---|---|
| 0150669 | 7/1985 | European Pat. Off. . |
| 0182986 | 4/1986 | European Pat. Off. . |
| 0199883 | 5/1986 | European Pat. Off. . |
| 0239670 | 7/1987 | European Pat. Off. . |
| 0005201 | 1/1980 | Japan ............ 408/6 |

Primary Examiner—Steven C. Bishop
Attorney, Agent, or Firm—Michael J. Striker

[57] ABSTRACT

A hand-held machine tool has a housing, a tool rotatable about a rotational axis, a motor provided with a gear unit and driving the tool in rotation about the rotational axis, the gear unit having at least one rotating part which is arranged so as not to be axially parallel to the rotational axis of the tool, a bearing supporting the rotating part of the gear unit, and a sensor arranged at the bearing so that the sensor lies in an effective region of bearing forces which are produced by a moment of occurring gyroscopic effect when the housing rotates around the rotational axis of the tool.

11 Claims, 1 Drawing Sheet

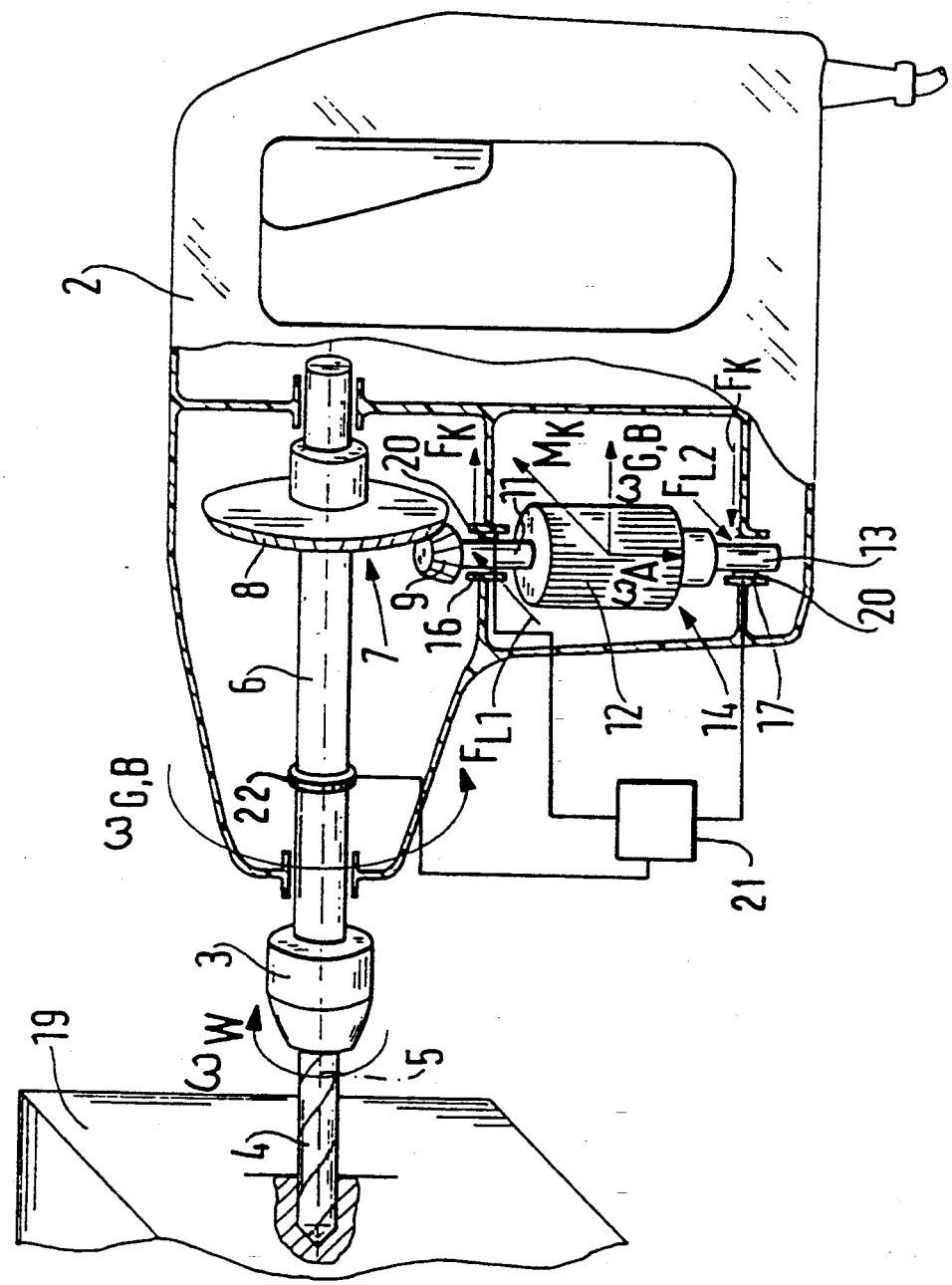

HAND-HELD POWER TOOL WITH JAMMING-DETECTION SENSOR

BACKGROUND OF THE INVENTION

The present invention relates to a hand-held machine tool.

More particularly, it relates to a hand-held machine tool, in particular a drill hammer, which has a housing and a tool driven in rotation by a motor with a gear unit. A hand-held machine tool having a separate bearing block and electrical force measuring device arranged at the latter for detecting sudden jamming or blockage of the tool is already known from EP 199 883 A2. This construction requires a specially designed bearing block which is also supported in the machine housing so as to be rotatable at a swivel axis. Since the bearing forces or reaction forces occurring as a result of the transmission of torque are measured, there is also a risk of faulty triggering when moment-transmitting shocks or impacts occur in normal operation.

SUMMARY OF THE INVENTION

Accordingly, it is an object of the present invention to provide a hand-held machine tool, which avoids the disadvantages of the prior art.

In keeping with these objects and with others which will become apparent hereinafter, one feature of the present invention resides, briefly stated, in a hand-held machine tool which has a sensor arranged at a bearing of a rotating part of the gear unit so that it lies in the effective region of the bearing forces produced by the moment of the occurring gyroscopic effect when the housing of the hand-held machine tool rotates around the rotational axis of the tool.

When the hand-held machine tool is designed in accordance with the present invention, it has the advantage over the prior art that the blocking of a tool can be detected in a reliable and simple manner without additional expenditure on construction. To do this the invention makes use of the effect whereby a forced change in position of a rotating body which is suspended at least at one point produces an additional angular momentum directed at a right angle to the deflection. This gyroscopic effect produces reaction or bearing forces in the bearings of the rotating part which do not occur in normal operation.

It is particularly advantageous to arrange the sensor or sensors on a line extending parallel to the rotational axis of the tool and through the center axis of the rotating part, particularly of the motor. The sensor can be constructed as a force measuring device or as a pressure sensor. It is also particularly advantageous if the rotating part is formed by the armature of the motor. As a result of the large mass moment of inertia of the armature, this leads to a correspondingly large additional angular momentum. The additional angular momentum can be detected particularly well if the bearing forces occurring in normal operation act in a different direction, especially so as to be offset by 90° relative to the gyroscopic forces. This can be achieved in that the gear members cooperating with the rotating part are arranged in such a way that the transmission forces do not act in the direction of the rotational axis of the tool, but rather at a right angle thereto. The measurement signal of the sensor is fed to a control device which causes an interruption in the rotational driving of the tool, particularly by switching off the motor or by opening a safety coupling.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a section through a hand-held machine tool formed as a drill hammer.

DESCRIPTION OF PREFERRED EMBODIMENT

A drill hammer 1 with a housing 2 and a tool carrier 3 which projects out of the housing and in which a drilling tool 4 is inserted is shown schematically in FIG. 1. A hammer mechanism which is accommodated in the housing 2 is not shown in the drawing. The drilling tool 4 is driven so as to rotate around its axis of rotation 5 by a spindle 6 supporting the tool carrier 3. The spindle 6 is connected in turn with a shaft 11 of an electric motor 12 via two bevel gears 8, 9 forming a gear unit 7. Of the motor, only the part 14 rotating around its center axis 13, i.e. the armature, is shown in the drawing. The center axis 13 lies vertically with respect to the rotational axis 5 of the tool 4. The shaft 11 is supported in two bearings 16, 17 which are rigidly connected with the housing and can be constructed e.g. as roller bearings. The motor shaft 11 and the spindle 6 are so disposed in relation to one another that the bearing forces in the bearings 16, 17 act in a plane situated vertically relative to the spindle 6, that is, in a plane parallel to the bevel gear 8. Thus, when the tool 4 is driven in rotation to the right the operating bearing force $F_{L1}$ occurs in the bearing 16 and the operating bearing force $F_{L2}$ occurs in the bearing 17.

The drill may jam when the drilling tool 4 penetrates a workpiece 19. This means that the angular velocity $\omega_W$ of the drilling tool 4 suddenly drops to zero. The motor 12 which continues to run now causes the housing 2 to rotate to the left around the rotational axis 5 according to the arrow designated by $\omega_{G,B}$. Accordingly, the rotating part 14 of the motor 12, which may now be considered as a gyroscope, is likewise deflected from its rest position so as to rotate to the left around the axis 5. This produces a change in the torsion vector or angular momentum vector as occurs when a gyroscope is deflected out of its rest position.

The moment of the gyroscopic effect $M_K$ is brought about by the forced change in the torsion vector:

$$\vec{M}_K = dD/dt = \vec{\omega}_{G,B} \times \vec{D}$$

or $$M_K = \omega_{G,B} \times \omega_A \times I_A,$$

where $\omega_{G,B}$ = the angular velocity of the housing in the event of jamming $\omega_A$ = the angular velocity of the armature $I_A$ = the mass moment of inertia of the armature The moment of the gyroscopic effect $M_K$ generates additional bearing forces $F_K$ in the bearings 16 and 17 which act at a 90-degree offset relative to the operating bearing forces $F_L$. In the effective region of the bearing forces $F_K$, a sensor 20 for measuring these forces is arranged at least at one of the bearings 16, 17. The sensors can be force measuring devices or force or pressure sensors which can be arranged in particular between the housing 2 and the bearings 16, 17.

The measurement signal of the sensor or sensors 20 is transmitted to a control device 21 which receives the level of the measurement signal and/or its shape, as the case may be, and causes the rotational driving of the tool 4 to be interrupted if a jammed tool is detected. This can be effected either in that the motor 12 is turned off or by triggering a safety coupling 22, known from the prior art, in the drive train between the motor 12 and the tool carrier 3. This safety coupling 22 promptly separates the motor 12 from the tool 4 so as also to prevent the housing 2 from rotating too far in the event of jamming.

The measurement signal obtained in the manner described above clearly shows a case of jamming, since no moment-transmitting shocks occur in the direction $F_K$ transverse to the operating bearing forces $F_L$ in normal operation. This prevents inappropriate triggering. The use of the gyroscopic effect has the further advantage that its magnitude depends on the torsional velocity of the housing and accordingly automatically adapts itself to the attitude of the operator. When the operator holds the housing 2 in such a way that no twisting occurs, the tool is also not separated from the motor. The full force of the machine can then be utilized for rotary drilling work.

It will be understood that each of the elements described above, or two or more together, may also find a useful application in other types of constructions differing from the types described above.

While the invention has been illustrated and described as embodied in a hand-held machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held machine tool, comprising a housing; a tool rotatable about a rotational axis; a motor provided with a gear unit and driving said tool in rotation about said rotational axis, said gear unit having at least one rotating part which is arranged so as not to be axially parallel to said rotational axis of said tool; a bearing supporting said rotating part of said gear unit; and a sensor arranged at said bearing so that said sensor lies in an effective region of bearing forces which are produced by a moment of occurring gyroscopic effect when said housing rotates around said rotational axis of said tool.

2. A hand-held machine tool as defined in claim 1, wherein said sensor is arranged on a straight line extending parallel to said rotational axis of said tool and passing through a center axis of said rotating part.

3. A hand-held machine tool as defined in claim 1, wherein said sensor is a force sensor.

4. A hand-held machine tool as defined in claim 1, wherein said sensor is a pressure sensor.

5. A hand-held machine tool as defined in claim 1, wherein said rotating part is formed as an armature of said motor.

6. A hand-held machine tool as defined in claim 1, wherein said housing, said tool and said motor with said gear unit are arranged so that the bearing forces produced by the moment of the occurring gyroscopic effect act in a different direction than bearing forces occurring in normal operation.

7. A hand-held machine tool as defined in claim 6, wherein said housing, said tool, and said motor with said gear unit are arranged so that the bearing forces produced by the moment of the occurring gyroscopic effect act transversely to the bearing forces occurring in normal operation.

8. A hand-held machine tool as defined in claim 1, wherein said gear unit has gear unit members cooperating with said rotating part and arranged so that transmission forces occurring in normal operation in said gear unit do not act in a direction of said rotational axis of said tool.

9. A hand-held machine tool as defined in claim 1; and further comprising a control device which causes an interruption of the rotation of said tool, said sensor being arranged so as to transmit a measurement signal to said control device for causing an interruption of the rotation of said tool.

10. A hand-held machine tool as defined in claim 9, wherein said control device is formed so as to cause said motor to be shut off.

11. A hand-held machine tool as defined in claim 9; and further comprising a safety coupling, said control device being formed so as to cause said safety coupling to be opened.

* * * * *